United States Patent
Pan

(10) Patent No.: US 12,175,629 B2
(45) Date of Patent: Dec. 24, 2024

(54) SYSTEMS AND METHODS FOR ADJUSTABLE IMAGE RESCALING

(71) Applicant: Baidu USA, LLC, Sunnyvale, CA (US)

(72) Inventor: Zhihong Pan, San Jose, CA (US)

(73) Assignee: Baidu USA LLC, Sunnyvale, CA (US)

( * ) Notice: Subject to any disclaimer, the term of this patent is extended or adjusted under 35 U.S.C. 154(b) by 407 days.

(21) Appl. No.: 17/588,103

(22) Filed: Jan. 28, 2022

(65) Prior Publication Data

US 2023/0245275 A1 Aug. 3, 2023

(51) Int. Cl.
*G06T 3/4076* (2024.01)
*G06T 3/4046* (2024.01)

(52) U.S. Cl.
CPC .......... *G06T 3/4076* (2013.01); *G06T 3/4046* (2013.01)

(58) Field of Classification Search
CPC ... G06T 3/4046; G06T 3/4053; G06T 3/4076; G06N 3/02–105
See application file for complete search history.

(56) References Cited

U.S. PATENT DOCUMENTS

2023/0093734 A1* 3/2023 Zheng ................... G06T 3/4084
382/276
2023/0206396 A1* 6/2023 Zheng ................... G06T 3/4053
382/100

OTHER PUBLICATIONS

Xiao, Mingqing, et al. "Invertible image rescaling." Computer Vision—ECCV 2020: 16th European Conference, Glasgow, UK, Aug. 23-28, 2020, Proceedings, Part I 16. Springer International Publishing, 2020. (Year: 2020).*
Martin et al.,"A database of human segmented natural images and its application to evaluating segmentation algorithms and measuring ecological statistics," in Proceedings Eighth IEEE International Conference on Computer Vision (ICCV), 2001. (8pgs).
Huang et al.,"Single Image Super-resolution from Transformed Self-Exemplars," in Proceedings of the IEEE conference on computer vision & pattern recognition, 2015. (10pgs).

(Continued)

*Primary Examiner* — Emily C Terrell
*Assistant Examiner* — Stefano Anthony Dardano
(74) *Attorney, Agent, or Firm* — Oppedahl Patent Law Firm LLC

(57) ABSTRACT

Presented herein are embodiments of systems and methods for training a system and for using a trained system to generate super-resolution imagery from low-resolution imagery. Embodiments for generating super-resolution imagery from low-resolution imagery include obtaining an input trade-off parameter that indicates a preference regarding low distortion or high perceptual quality for a generated SR image and obtaining a latent variable from a distribution defined, at least in part, by a trade-off parameter. Embodiments include inputting an LR image and the latent variable into an embodiment of an invertible rescaling network (IRNN) in an inverse upscaling direction of the IRNN to generate an output SR image that comprises accuracy and perception qualities conditioned by the input trade-off parameter. In one or more embodiments, a trained IRNN uses a trade-off parameter that indicates a desired trade-off between whether the trained IRNN generates an SR image having lower distortion or higher perceptual quality.

20 Claims, 12 Drawing Sheets

(56) References Cited

OTHER PUBLICATIONS

Agustsson et al., "NTIRE 2017 Challenge on Single Image Super-Resolution: Dataset and Study," in Proceedings of the IEEE Conference on Computer Vision & Pattern Recognition Workshops, 2017. (10 pgs).
Johnson et al.,"Perceptual Losses for Real-Time Style Transfer and Super-Resolution," arXiv preprint arXiv:1603.08155, 2016. (18pgs).
Wang et al.,"ESRGAN: Enhanced Super-Resolution Generative Adversarial Networks," arXiv preprint arXiv:1809.00219, 2018. (23pgs).
Ardizzone et al.,"Guided Image Generation With Conditional Invertible Neural Networks," arXiv preprint arXiv:1907.02392, 2019. (11pgs).
Kim et al.,"Task-Aware Image Downscaling," in Proceedings of the European Conference on Computer Vision (ECCV), 2018. (16pgs).
Sun et al.,"Learned image downscaling for upscaling using content adaptive resampler," arXiv preprint arXiv:1907.12904, 2019. (14pgs).
Xiao et al.,"Invertible image rescaling," arXiv preprint arXiv:2005.05650, 2020. (27pgs).
Ardizzone et al.,"Analyzing inverse problems with invertible neural networks," arXiv preprint arXiv:1808.04730, 2019. (20pgs).
T. M. Cover, "Elements of information theory," John Wiley & Sons, 1999. (774).
Bell-Kligler et al.,"Blind Super-Resolution Kernel Estimation using an Internal-GAN," arXiv preprint arXiv:1909.06581, 2020. (10pgs).
Wang et al.,"Image quality assessment: from error visibility to structural similarity," IEEE transactions on image processing, vol. 13, No. 4, 2004. (14pgs).
Zhang et al.,"The unreasonable effectiveness of deep features as a perceptual metric,"arXiv preprint arXiv:1801.03924, 2018. (14pgs).
Bevilacqua et al.,"Low-complexity singleimage super-resolution based on nonnegative neighbor embedding," in Proceedings of the British Machine Vision Conference, 2012. (10pgs).
Zeyde et al.,"On single image scale-up using sparse-representations," in International conference on curves & surfaces, Springer, 2010. (21 pgs).
Dong et al.,"Learning a deep convolutional network for image super-resolution," in European conference on computer vision,Springer, 2014. (16pgs).
Zhang et al.,"Image super-resolution using very deep residual channel attention networks," in Proceedings of the European Conference on Computer Vision (ECCV), 2018. (16pgs).
Blau et al.,"The Perception-Distortion Tradeoff," in Proceedings of the IEEE Conference on Computer Vision & Pattern Recognition, 2018. (10pgs).
Ledig et al., "Photo-Realistic Single Image Super-Resolution Using a Generative Adversarial Network," In: Proceedings of the IEEE conference on computer vision & pattern recognition, 2017. (10 pgs).
Sajjadi et al.,"EnhanceNet: Single image super-resolution through automated texture synthesis," in Proc. of the IEEE International Conference on Computer Vision, 2017.(10 pgs).
Wang et al.,"ESRGAN:Enhanced super-resolution generative adversarial networks," in Proceedings of the European Conference on Computer Vision (ECCV), 2018. (16 pgs).
Xin Deng, "Enhancing image quality via style transfer for single image super-resolution," IEEE Signal Processing Letters, vol. 25, No. 4, 2018. [Abstract] (1p).
Xin Deng,"Wavelet domain style transfer for an effective perception-distortion tradeoff in single image superresolution," in Proc. of the IEEE/CVF International Conference on Computer Vision, 2019. (10pgs).

* cited by examiner

| Method | Dataset 1 LPIPS↓ | Dataset 1 PSNR/SSIM↑ | Dataset 2 LPIPS↓ | Dataset 2 PSNR/SSIM↑ | Dataset 3 LPIPS↓ | Dataset 3 PSNR/SSIM↑ | Dataset 4 LPIPS↓ | Dataset 4 PSNR/SSIM↑ | Dataset 5 LPIPS↓ | Dataset 5 PSNR/SSIM↑ |
|---|---|---|---|---|---|---|---|---|---|---|
| RCAN | 0.1695 | 32.64/0.899 | 0.2740 | 28.85/0.788 | 0.3589 | 27.74/0.742 | 0.1967 | 26.75/0.806 | 0.2547 | 30.72/0.844 |
| ESRGAN | 0.0726 | 30.46/0.851 | 0.1323 | 26.28/0.697 | 0.1630 | 25.29/0.649 | 0.1239 | 24.35/0.732 | 0.1150 | 28.17/0.775 |
| IRN | 0.0782 | 36.19/0.944 | 0.1237 | 32.67/0.901 | 0.1654 | 31.63/0.881 | 0.0836 | 31.40/0.915 | 0.1174 | 35.07/0.931 |
| IRN+ | 0.0312 | 33.63/0.914 | 0.0668 | 29.97/0.843 | 0.0749 | 28.93/0.818 | 0.0550 | 28.24/0.867 | 0.0541 | 32.24/0.891 |
| IRN$_{x=0}$ | 0.0726 | 36.08/0.943 | 0.1178 | 32.54/0.898 | 0.1626 | 31.48/0.879 | 0.0798 | 31.20/0.913 | 0.1130 | 34.91/0.929 |
| IRN$_{x=1}$ | 0.0336 | 34.79/0.924 | 0.0664 | 31.27/0.870 | 0.0778 | 30.17/0.848 | 0.0487 | 30.19/0.896 | 0.0534 | 33.66/0.910 |

FIG. 8

SYSTEMS AND METHODS FOR ADJUSTABLE IMAGE RESCALING

BACKGROUND

A. Technical Field

The present disclosure relates generally to systems and methods for computer learning that can provide improved computer performance, features, and uses. More particularly, the present disclosure relates to systems and methods for adjustable image rescaling with joint optimization of perception and distortion.

B. Background

Deep neural networks have achieved great successes in many domains, such as computer vision, natural language processing, recommender systems, etc. One domain in which deep neural networks (and other artificial intelligence or machine learning modules) have been applied is super-resolution processing, which includes generating high-resolution (HR) (or super-resolution (SR)) imagery from low-resolution (LR) imagery. One challenge that exists in SR processing is that a single input LR image may correspond to multiple output SR images. Many conventional SR models are optimized for this 1-to-N correspondence problem upscaling task by assuming a predefined downscaling kernel for input LR images. Additionally, there exists a conflict between the objective qualities (e.g., distortion or accuracy, etc.) and perceptual qualities (e.g., edge sharpness, resolvability of features, etc.) of upscaled outputs for optimizing these models. To achieve an effective trade-off between these objective qualities and perceptual qualities, existing SR models are either inflexible (e.g., where the models are optimized for a fixed tradeoff between objective and perceptual qualities), or inefficient (e.g., where models interpolate weights or output images from two separately trained models to generate a final output SR image).

Accordingly, what is needed are improved systems, methods, and techniques for facilitating image rescaling.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1A.

FIG. 8 depicts a table showing a comparison of objective and perceptual qualities for upscaled images from five datasets generated using different rescaling models, according to embodiments of the present disclosure.

DETAILED DESCRIPTION OF EMBODIMENTS

Figure 1A:
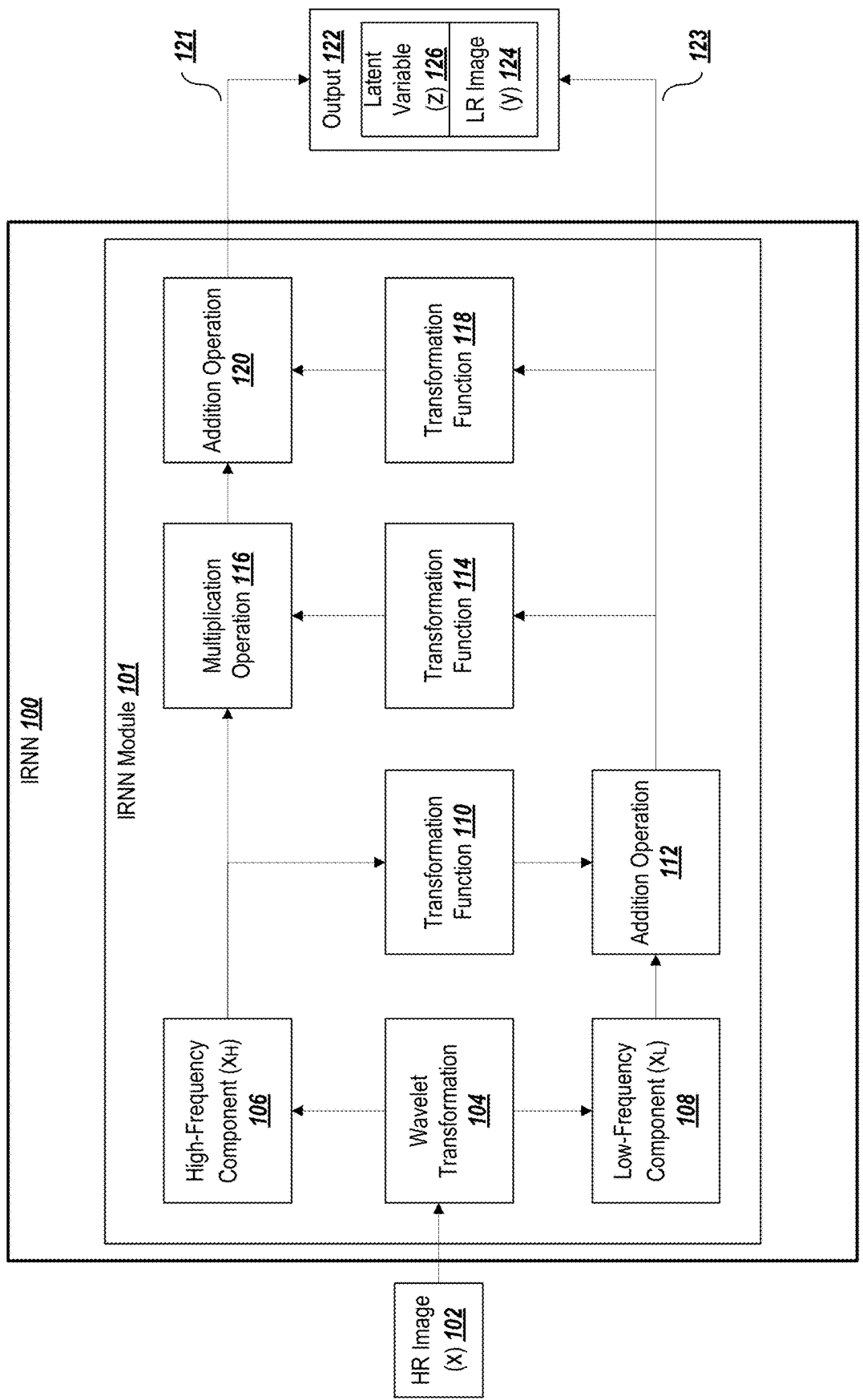
FIG. 1B, FIG. 1C, and FIG. 1D depict conceptual representations of example components and operation of an invertible rescaling neural network (IRNN) in a forward direction (FIG. 1A) and in an inverse direction (FIG. 1C and FIG. 1D), according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to a system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although at least some embodiments described herein may be within the context of image compression or decompression, aspects of the present disclosure are not so limited. Accordingly, aspects of the present disclosure may be applied or adapted for use in other contexts.

C. General Introduction

Image super-resolution (SR) processing involves recovering high-resolution (HR) images from low-resolution (LR) inputs. One challenge associated with SR processing is the existence of multiple possible HR images that may result from the same downscaled LR image. Powerful deep learning techniques have led to development of single-image super-resolution models. Conventional models aim to minimize the mean squared error (MSE) or loss between the restored SR image(s) and the ground truth (GT) image(s). Because such models attempt to accommodate the mapping between one LR input and multiple HR outputs, such models often generate blurred output that lacks sharp details, thereby failing to appear realistic. While it is desirable to restore an SR image that is both accurate and photo-realistic, configuring a model to attain high accuracy typically comes at the expense of perceptual quality, and vice-versa (e.g., configuring a model to attain high perceptual quality typically comes at the expense of accuracy). Thus, for methods configured to output SR images with improved perceptual image quality (e.g., using adversarial training), the outputs are typically sharper but are subjected to lower accuracy when compared to the GT images.

Some approaches have arisen that attempt to balance perceptual quality and accuracy by training models MSE and adversarial losses. However, such approaches typically lead to unstable training due to the natural conflict between MSE and adversarial losses, which may cause undesirable artifacts. Such approaches are also inflexible (e.g., the mixture of losses is part of the hyperparameters determined before training). Other approaches attempt to achieve a desirable trade-off between perceptual quality and accuracy utilize two or more separate models. For example, two separate networks may be trained that enhance the objective quality and the perceptual quality, respectively, and combine them using weighted interpolation (or style transfer). However, multi-model methods are not computationally efficient for training or for inference (e.g., because additional image interpolation or fusion is performed).

Another drawback of many image SR models originates from their dependence on training with LR-HR image pairs, in particular where the LR inputs are synthesized from a predefined downscaling kernel. Furthermore, the models are trained for upscaling reconstruction only, without considering the image downscaling method. Some techniques have arisen that implement an auto-encoder framework to jointly train image downscaling and upscaling together. In addition, some techniques implement a content adaptive-resampler based image downscaling method, which can be jointly trained with any existing differentiable upscaling (SR) models.

Some techniques implement an invertible rescaling network (IRN), which learns to convert HR input to LR output and an auxiliary latent variable z. By mapping z to a case-agnostic normal distribution during training, inverse image upscaling may be implemented by randomly sampling z from a normal distribution without the need of a case-specific latent variable (e.g., $\hat{z}$). Using different losses at training, an IRN can be optimized for either objective or perceptual quality. Interpolation or fusion of two images from two separately optimized models can be used to achieve a good trade-off between perception and distortion. However, as noted above, such approaches lead to inefficiency.

To overcome such inefficiency, at least some embodiments of the present disclosure provide a joint optimization method for training a single model that can be used to achieve adjustable trade-off between perception and distortion at inference. Based on the IRN, a mixture of reconstruction, perceptual and adversarial losses may be used for training. The losses related to upscaling are conditioned on a randomly sampled auxiliary latent variable z during joint optimization. At inference, upscaled outputs can be adjusted by modulating the random sampling of z.

Thus, implementations of the present disclosure may facilitate training of one image rescaling model with joint optimization for both objective and perceptual qualities. A model trained in accordance with the present disclosure may be capable of generating upscaled images, in one inference, with adjustable trade-off between the two qualities (e.g., accuracy and perceptual quality) using latent feature modulation. Furthermore, it has been shown that a model trained in accordance with the present disclosure is able to produce upscaled images with less distortion (e.g., compared to the output of a model trained solely for perception), without suffering in perceptual quality.

D. Embodiments of Invertible Rescaling Neural Networks (IRNNs)

Although the present description focuses, in at least some respects, on examples of invertible rescaling networks (IRNs) with particular structure, the principles disclosed herein may be implemented utilizing substantially any type of invertible neural network that is usable to rescale imagery. Such networks are referred to herein as invertible rescaling neural networks (IRNNs).

It shall be noted that high-resolution (HR) and super-resolution (SR) may be used interchangeably, in some instances.

Figure 1B:
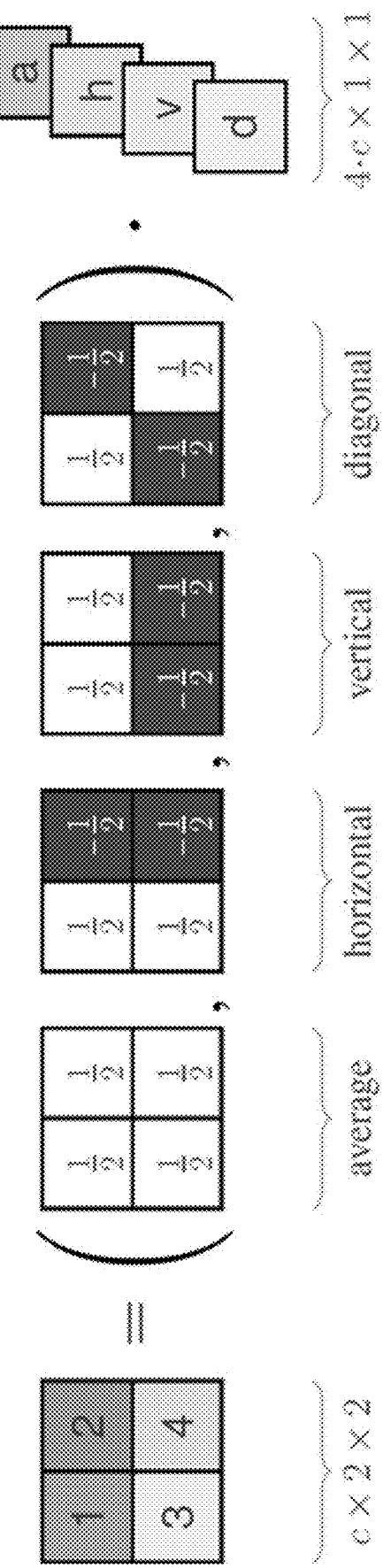

FIG. 1A illustrates an example network architecture of an IRNN 100, which is depicted as an IRN with particular structure, according to embodiments of the present disclosure. FIG. 1A illustrates an input high-resolution HR image 102 ($x$) which may be utilized as input to the IRNN 100. FIG. 1A shows that the IRNN may perform a wavelet transformation 104 on x to separate the high-frequency component 106 ($x_H$) from the low-frequency component 108 ($x_L$). In some embodiments, the wavelet transformation 104 comprises a Haar transformation configured to decompose input imagery into an approximate low-pass representation (e.g., an average pooling channel) and three directional derivatives (e.g., vertical, horizontal, and diagonal high-frequency coefficients). Attention is briefly directed to FIG. 1B, which illustrates a conceptual representation of a Haar transformation, wherein each set of input pixels (of c sets of 2×2 pixels; left-hand side in FIG. 1B) is decomposed into four separate sets of downscaled pixels (4×c sets of 1×1 pixels; right-hand side in FIG. 1B, where "a" represents an average representation, "h" represents a horizontal derivative representation, "v" represents a vertical derivative representation, and "d" represents a diagonal derivative representation). As illustrated in FIG. 1B, the respective four sets of downscaled pixels may comprise an average of the input pixels (sum of ½ of each input pixel value), a horizontal derivative (sum of ½ of the first column input pixel values and −½ of the second column input pixel values), a vertical derivative (sum of ½ of the first-row input pixel values and −½ of the second-row input pixel values), and a diagonal derivative (sum of ½ of the (1,1) and the (2,2) pixel values and −½ of the (1,2) and (2,1) pixel values). The four separate sets of downscaled pixels may form four separate representations of the input imagery (i.e., the average representation comprising the low-frequency component 108 of FIG. 1A, and the horizontal, vertical, and diagonal representations forming the high-frequency component 106 of FIG. 1A). The wavelet transformation 104 may comprise alternative forms, such as a triangular wavelet, Daubechies wavelet, Mexican hat wavelet, and/or others.

Attention is again directed to FIG. 1A, which illustrates that $x_H$ and $x_L$ may be utilized as input to various transformational functions and operations (e.g., according to a general coupling layer architecture) to further abstract the representations generated from x via the wavelet transformation 104. FIG. 1A shows an addition operation 112 performed using $x_L$ and $x_H$ as transformed via transformation function 110. FIG. 1A also shows a multiplication operation 116 performed using $x_H$ and $x_L$ as transformed via transformation function 114. FIG. 1A furthermore shows another addition operation 120 performed on the output of the multiplication operation 116 and $x_L$ as transformed via transformation function 118. In this regard, the IRNN 100 implements an additive transformation for $x_L$ and an enhanced affine transformation for $x_H$. The transformation functions 110, 114, and 118 may comprise one or more convolutional neural networks (e.g., one or more Residual-in-Residual Dense Blocks (RRDB), Dense Blocks, and/or other densely connected convolutional blocks, which may comprise layers implementing non-linear transformations (e.g., batch normalization, rectified linear units (ReLU), pooling, convolution, etc.) where layers with matching feature map sizes are connected to one another and/or where each layer obtains additional inputs from all preceding layers by concatenation or addition). The transformation functions 110, 114, and 118 may comprise matching input and output channels (e.g., to facilitate the inverse nature of the IRNN).

It will be appreciated that the particular structure and/or components of the IRNN 100 of FIG. 1A is/are provided by way of example only and are not limiting of the present disclosure. For example, the IRNN module 101 may be varied by implementing an exponential function in transformation function 114 and/or a centered sigmoid function and/or a scaling term following the transformation function 114 to prevent numerical explosion due to the exponential function. As another example, an additional transformation function may receive $x_H$, the output of which may be provided to an additional multiplication operation that also receives $x_L$, where the output of the additional multiplication operation is provided to the addition operation 112 (e.g., instead of providing $x_L$ to the addition operation 112 directly).

FIG. 1A illustrates that the output 122 of the IRNN 100 (e.g., resulting from the addition operation 112 and the addition operation 120) comprises a low-resolution image 124 ($y$) and a latent variable (z) 126 (e.g., y may result from addition operation 112, and z may result from addition operation 120).

Although FIG. 1A illustrates an embodiment in which a single module (i.e., IRNN module 101) is employed in the IRNN 100, it should be noted that different embodiments may employ differ numbers of IRNN modules, which may be arranged in a cascaded or other configuration, to generate low-resolution imagery and/or latent variable output. In one or more embodiments where multiple IRNN modules are used, one or more of the IRNN modules may omit the wavelet transformation operations (e.g., wavelet transformation 104 to generate the high-frequency component 106 and low-frequency component 108), as each wavelet transformation increases the scale factor (e.g., increases the scale factor by 2×). In one or more embodiments, the output 121 of an IRNN module (e.g., IRNN module 101) may be input into the transformation function 110 and the multiplication operation 116 of the next IRNN module (not depicted), and the output 123 of the IRNN module (e.g., IRNN module 101) may be input into the addition operation 112 of the next IRNN module (not depicted).

The downscaling process facilitated by the IRNN (e.g., operating in the forward direction) may be described as (y, z)=f(x). Because the wavelet transformation 104 and the transformation functions 110, 114, and 118 comprise invertible functions, the inverse upscaling process of the IRNN may be described as $x=f^{-1}(y, z)$ and may be determined once f is known. It will be appreciated, in view of the present disclosure, that multiple IRNN modules may be cascaded to achieve a desired scaling factor.

Figure 1C:
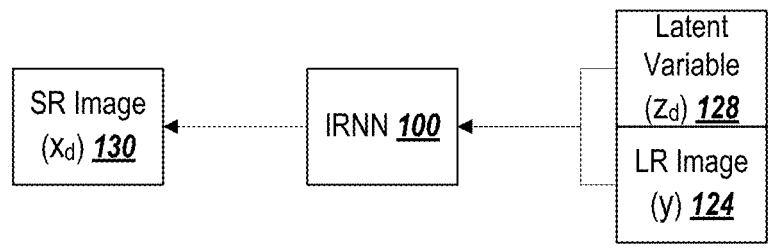
Figure 1D:
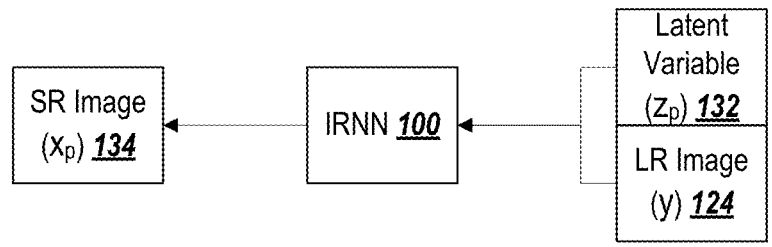

Due to the ill-posed nature of upscaling, there are multiple versions of HR image outputs corresponding to variations in z. By way of example, FIG. 1C illustrates a latent variable 128 ($z_d$), which may comprise a $z_d$ configured to optimize accuracy in an output HR image. FIG. 1C illustrates $z_d$ provided as input with the LR image 124 ($y$) to the IRNN 100 in the inverse upscaling direction (e.g., which may be represented as $x_d = f^{-1}(y, z_d)$) to generate an SR image 130 ($x_d$) that may be similar to the original HR image 102 ($x$ from FIG. 1A) with little distortion, but may include blurring artifacts and/or lower perceptual quality. In contrast, FIG. 1D illustrates a latent variable 132 ($z_p$), which may comprise a $z_p$ configured to optimize perceptual quality in an output HR image. FIG. 1D illustrates $z_p$ provided as input with y to the IRNN 100 in the inverse upscaling direction to generate an SR image 134 ($x_p$) that may comprise sharper details and better perception than $x_d$, but may suffer a loss in accuracy.

Some methods utilize z as a case-agnostic random variable, thus allowing the inverse upscaling process to be used to reconstruct an HR image (e.g., $\hat{x}$) that either prioritizes objective quality (e.g., $x_d$) or perceptual quality (e.g., $x_p$) using different mixtures of losses, as shown below in Equation (1):

$$L = \lambda_1 L_r + \lambda_2 L_g + \lambda_3 L_d + \lambda_4 L_p \qquad (1)$$

Referring to Equation (1), $\lambda_1$, $\lambda_2$, $\lambda_3$, and $\lambda_4$, are coefficients for balancing different loss terms. $L_r$ is the L1 reconstruction loss for upscaled HR output and $L_g$ is the L2 guidance loss for downscaled LR output. $L_d$ is either implemented as distribution regulation of the latent variable z to help train a model (e.g., an IRN structured according to FIG. 1A) with minimal distortion, or as an adversarial loss from a co-trained discriminator to train a model (referred to herein as IRN+) generating photo-realistic HR images. According to Equation (1), the perceptual loss $L_p$ is only used for IRN+ when the goal is best perceptual quality.

For methods implementing the above losses may operate adequately for either optimal objective or perceptual qualities, such methods suffer from inefficiency. For example, in addition to requiring training of two separate models, the random sampling of z from the normal distribution N(0,1) does little in increasing diversity of upscaled outputs. For example, in the case of an IRN, differences in peak signal-to-noise ratio (PSNR) observed from different z samples are less than 0.02.

Accordingly, at least some implementations of the present disclosure are directed to a joint optimization method to train a single multi-use model that can generate multiple HR outputs with different qualities (e.g., high perception, high accuracy, or an adjustable trade-off between perception and accuracy) by sampling z differently.

E. Embodiments of Joint Optimization of IRNNs

For learned image rescaling problems, the quantized image of a downscaled image y can be used as a known input for inverse upscaling. For a conventional IRN, as latent variable z is also used as an input for upscaling, a case-agnostic random variable may be used at inference. In contrast, to achieve flexible trade-off between perception and distortion with one model in accordance with the present disclosure, additional information from z is utilized. For a randomly sampled z, there are associated parameters μ (mean) and σ (standard deviation). On the other hand, information theory indicates that the differential entropy of a normal distribution is $\ln(\sigma\sqrt{2\pi e})$, which depends on the standard deviation σ. In other words, the entropy of normally distributed z is higher when z has higher variance (i.e., a larger σ). Furthermore, a restored an HR image with little distortion (e.g., $x_d$ from FIG. 1C) includes more blurring while an HR image that is optimized for better perception (e.g., $x_p$ from FIG. 1D) has sharper details (e.g., less blurring). Accordingly, $x_p$ has higher entropy than $x_d$.

In view of the foregoing, at least some embodiments of the present disclosure provide a joint optimization method for training an IRNN model using the following loss:

$$L = (1-\sigma)\lambda_1 L_r + \lambda_2 L_g + \sigma(\lambda_3 L_d + \lambda_4 L_p) \qquad (2)$$

According to Equation (2), $\lambda_1$, $\lambda_2$, $\lambda_3$, and $\lambda_4$, are coefficients for balancing different loss terms. $L_r$ is the reconstruction loss (e.g., L1 loss) for the upscaled HR output (e.g., a difference between a reconstructed SR image and a ground truth HR image). $L_r$ may additionally or alternatively comprise an L2 loss (e.g., a guidance loss) structural similarity index measure (SSIM), multi-scale structural similarity index measure (MS-SSIM), combinations/mixtures thereof, and/or others. In one or more embodiments, $L_g$ comprises a guidance loss (e.g., L2 loss, based upon a difference between a low-resolution image generated via the IRNN and a reference low-resolution image generated by other means, such as bicubic interpolation and/or other downsampling techniques), a reconstruction loss, SSIM, MS-SSIM, combinations/mixtures thereof, and/or others.

$L_d$ comprises an adversarial loss generated via a generative adversarial network (e.g., a VGG-128 discriminator, VGG-19, PatchGAN, and/or others). The generative adversarial network (GAN) may be co-trained with the IRNN to update the GAN's ability to distinguish the reconstructed SR image and the ground truth HR image.

$L_p$ may comprise a feature reconstruction loss, such as a loss calculated utilizing a Gram matrix of feature vectors determined from the reconstructed SR image and/or the ground truth HR image.

With regard to Equation (2), "distortion loss" may refer to at least $L_r$ (e.g., as modified by the complement of σ), and "perception loss" may refer at least to $L_d$ and may refer to the combination of the $L_d$ and $L_p$ terms (e.g., as modified by σ).

When training an IRNN in accordance with Equation (2), the forward downscaling process is the same as shown above with reference to FIG. 1A. For upscaling, z is randomly sampled from N(0, σ). In one or more embodiments, σ is within a range of (0,1) during training. Thus for smaller σ, the latent variable z has lower entropy, and the model is biased towards minimizing reconstruction loss $L_r$, which leads to restored HR output with less distortion and relatively lower entropy. When σ is larger and z has higher entropy, the model is biased towards perception-related losses $L_d$ and $L_p$.

After the joint optimization is completed, based on a desired trade-off between perception and distortion (e.g., provided via user input or a predetermined trade-off parameter definition), the upscaled image can be flexibly generated as $x_o = f^{-1}(y, z_o)$, where $z_o$ is randomly sampled from N(0, σ). For example, σ may be set to 0 to obtain an SR image with less/least distortion (best accuracy), whereas σ may be set to 1 to obtain an SR image with better/best perception. As noted above, σ may be selected at inference time of upscaling, and, advantageously, only a single model is needed to facilitate generation of SR images that reflect a trade-off between accuracy and perceptive quality.

F. Example Method Embodiments

Figure 2:
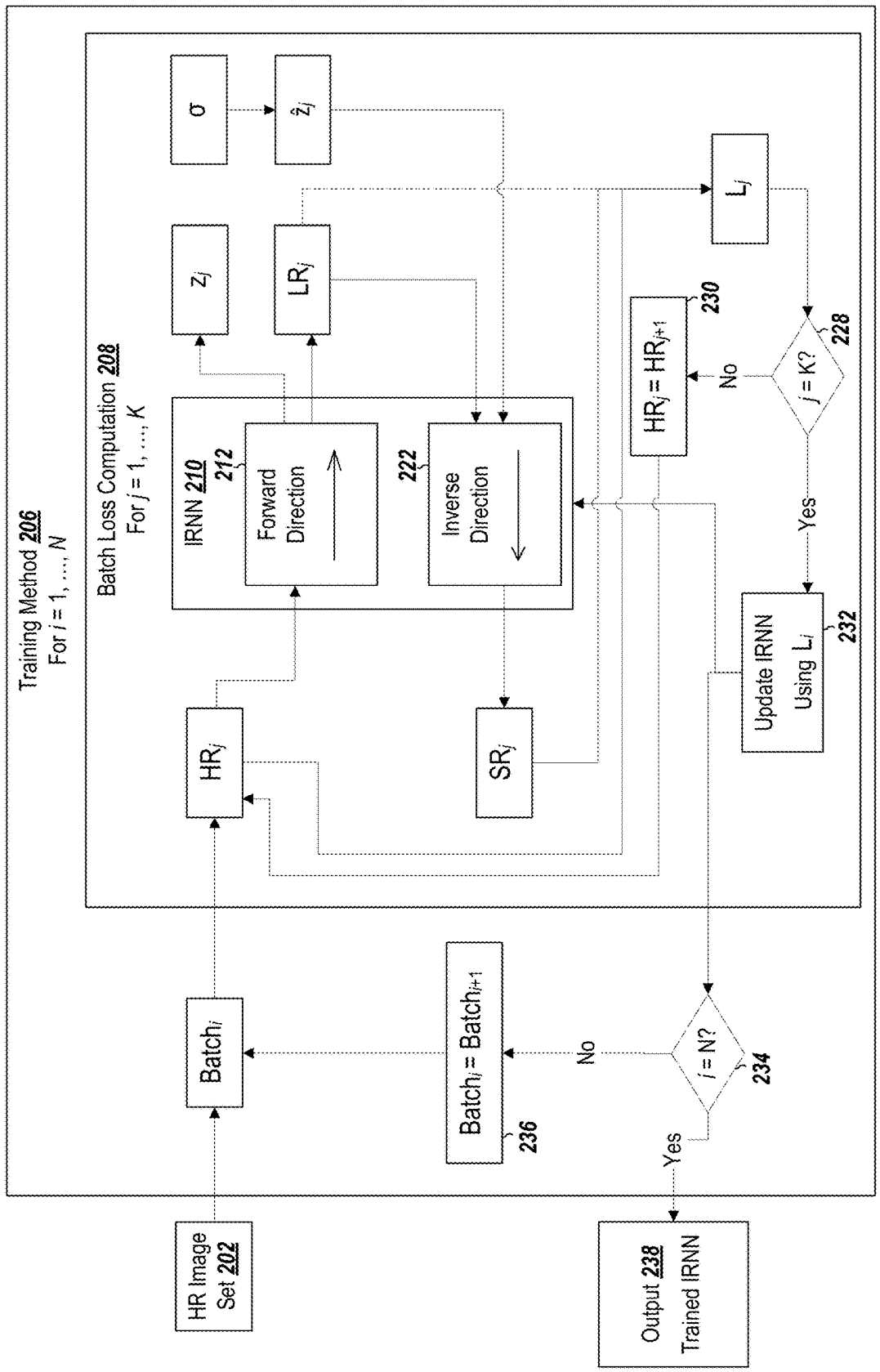
FIG. 2 depicts a schematic representation of jointly optimizing an IRNN to generate SR image output that incorporates a trade-off between distortion and perception, according to embodiments of the present disclosure.

FIG. 2 depicts a schematic representation 200 of jointly optimizing an IRNN to generate SR image output that incorporates a trade-off between distortion and perception, according to embodiments of the present disclosure. In particular, FIG. 2 illustrates an HR image set 202, which may comprise a plurality of HR images. From the HR image set 202, a plurality of batches may be obtained or sampled, indicated in FIG. 2 by the arrow extending from HR image set 202 to a current batch being processed (Batch$_i$). The batches of HR images obtained from the HR image set 202 may be utilized according to training method 206, where various acts may be performed until a particular stop condition is satisfied (e.g., until performance of a predetermined number of iterations is detected (e.g., corresponding to the number of batches obtained from HR image set 202), as indicated in the training method 206 of FIG. 2 by "For i=1, . . . , N").

FIG. 2 depicts that various acts may be performed using the images of the current batch (Batch$_i$), as indicated in FIG. 2 by the arrow extending from the current batch (Batch$_i$) to a current HR image of the batch being processed (HR$_j$), according to embodiments of the present disclosure. The HR images in a batch of HR images may be processed according to batch loss computation 208 until a particular stop condition is met (e.g., until performance of a predetermined number of iterations is detected (e.g., corresponding to the number of HR images in the current batch), as indicated in the training method 206 of FIG. 2 by "For j=1, . . . , K").

Proceeding with the batch loss computation 208, similar to FIG. 1A discussed above, the current image (HR$_j$) of the current batch (Batch$_i$) may be utilized as input to an IRNN 210 (e.g., conceptually corresponding to IRNN 100 discussed hereinabove) in the forward direction 212 (i.e., the downscaling direction) thereof. The IRNN 210 operating in the forward direction 212 outputs a current low-resolution image (LR$_j$) and a current auxiliary latent variable (z$_j$). As noted above, a trade-off parameter (σ$_j$) may be selected (e.g., within a range of (0,1)) and used to generate a random latent variable (ẑ$_j$), which may be randomly generated/sampled from a normal (or other types) of distribution N(0, σ$_j$). The trade-off parameter (σ$_j$) may be selected to facilitate a trade-off between perception loss and accuracy loss during training (e.g., σ=0 corresponding to higher accuracy, σ=1 corresponding to higher perceptual quality).

Proceeding with the Batch Loss Computation 208, similar to FIG. 1C and FIG. 1D, the current LR image (LR$_j$) and the current random latent variable (ẑ$_j$) are provided as input to the IRNN 210 in an inverse direction 222 to generate a current reconstructed SR image (SR$_j$). Based on at least the current reconstructed SR image (SR$_j$) and the current HR image (HR$_j$) (e.g., to generate L$_r$, L$_d$, and/or L$_p$), and optionally the current LR image (LR$_j$) (e.g., to generate L$_g$), a current loss (L$_j$) may be determined (e.g., utilizing Equation (2) discussed hereinabove), as indicated by the various arrows extending toward (L$_j$) in FIG. 2.

Having acquired the current loss (L$_j$) (e.g., for the current frame (HR$_j$) of the current batch (Batch$_i$)), processing may proceed to decision block 228, wherein, if j≠K, then another loss may be calculated for the next image in the current batch (Batch$_i$), as indicated in FIG. 2 by the arrow labeled "No" extending from decision block 228 toward an act 230 of redefining the current image (HR$_j$) as the next image (HR$_{j+1}$) in the current batch (Batch$_i$), whereupon processing may proceed to providing the newly defined current image frame as input to the IRNN 210 in the forward direction 212 to continue with generation of a new current loss. If j=K according to decision block 228 (indicating that at least a respective loss (L$_j$) has been obtained for all images in the current batch (Batch$_i$)), the IRNN 210 may be updated (e.g., via backpropagation) using the losses (L$_j$) determined from images within the current batch (Batch$_i$), as indicated in FIG. 2 by the arrow labeled "Yes" extending from decision block 228 toward an act 232 of updating the IRNN 210 using losses from the current batch (L$_j$).

If the IRNN 210 is updated, processing may proceed to decision block 234, wherein, if i≠N, then another batch from the HR image set 202 may be processed according to the batch loss computation 208, as indicated in FIG. 2 by the arrow labeled "No" extending from decision block 234 toward an act 236 of redefining the current batch (Batch$_i$) as the next batch (Batch$_{i+1}$) from the HR image set 202, whereupon processing may proceed to providing the newly defined current batch as input to batch loss computation 208. If i=N according to decision block 234 (indicating that the IRNN 210 has been updated using losses obtained for each batch of HR images from the HR image set 202), the trained IRNN may be output), as indicated in FIG. 2 by the arrow labeled "Yes" extending from decision block 234 toward output 238 comprising the trained IRNN.

In one or more embodiments, multiple different trade-off parameters (σ) may be utilized to generate multiple random latent variables (ẑ) for a single SR image frame of a batch (thereby generating multiple different reconstructed SR images for each SR image frame of the batch), or for different images within a batch, or for different batches. For instance, multiple different predefined trade-off parameters (σ) may comprise predefined values within a range of 0 and 1 (e.g., values selected from the group comprising: 0, 0.1, 0.2, 0.3, 0.4, 0.5, 0.6, 0.7, 0.8, 0.9, and 1, values selected from the group comprising 0, 0.5, and 1, values selected from the group comprising 0 and 1, and/or others) and/or randomly generated values within a range of 0 and 1.

Figure 3:
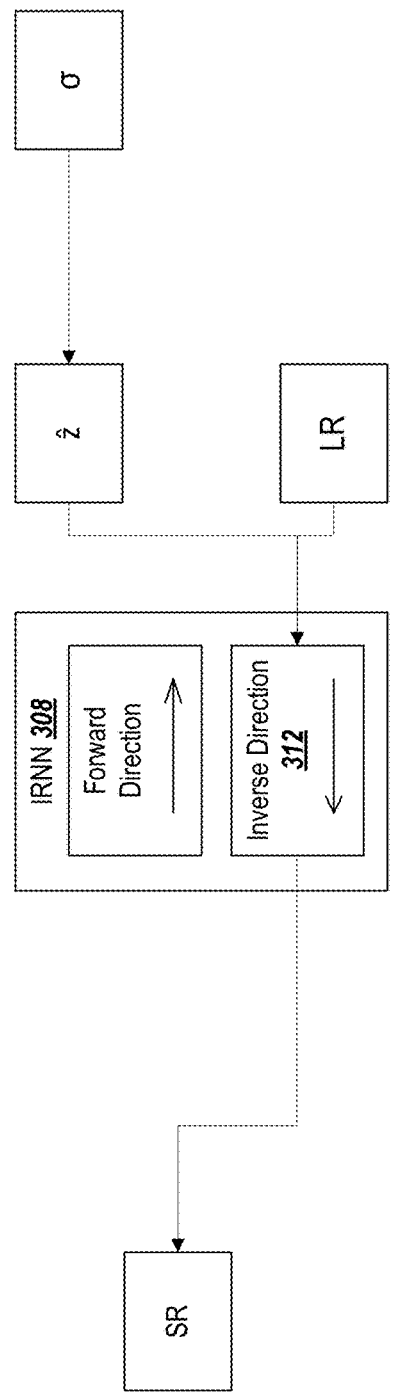
FIG. 3 depicts a schematic representation of generating an SR image that reflects a trade-off between distortion and perception, according to embodiments of the present disclosure.

FIG. 3 depicts a schematic representation 300 of generating an SR image that reflects a trade-off between distortion and perception, according to embodiments of the present disclosure. In particular, FIG. 3 illustrates an input trade-off parameter (σ), which may be obtained or selected at inference time. The input trade-off parameter (σ$_j$) may be indicative of preference for a trade-off between perception and accuracy during training (e.g., σ=0 corresponding to higher accuracy, σ=1 corresponding to higher perceptual quality). The input trade-off parameter (σ) may be used to generate a random latent variable (ẑ), which may be randomly generated/sampled from a normal distribution N(0, σ) or other type of distribution.

The random latent variable (ẑ) may be used in combination with a low-resolution image (LR) as input to an IRNN 308 (which may be trained in accordance with the training method 206 of FIG. 2) in the inverse direction 312 to generate a reconstructed SR image (SR), which may reflect the preference between perception and accuracy indicated by the trade-off parameter (σ).

In one or more embodiments, multiple random latent variables may be generated from the same input trade-off parameter and used in combination with the same low-resolution image to generate multiple super-resolution images, which may be combined (e.g., by averaging or weighted averaging and/or other combination methods) to generate a final super-resolution image.

Figure 4:
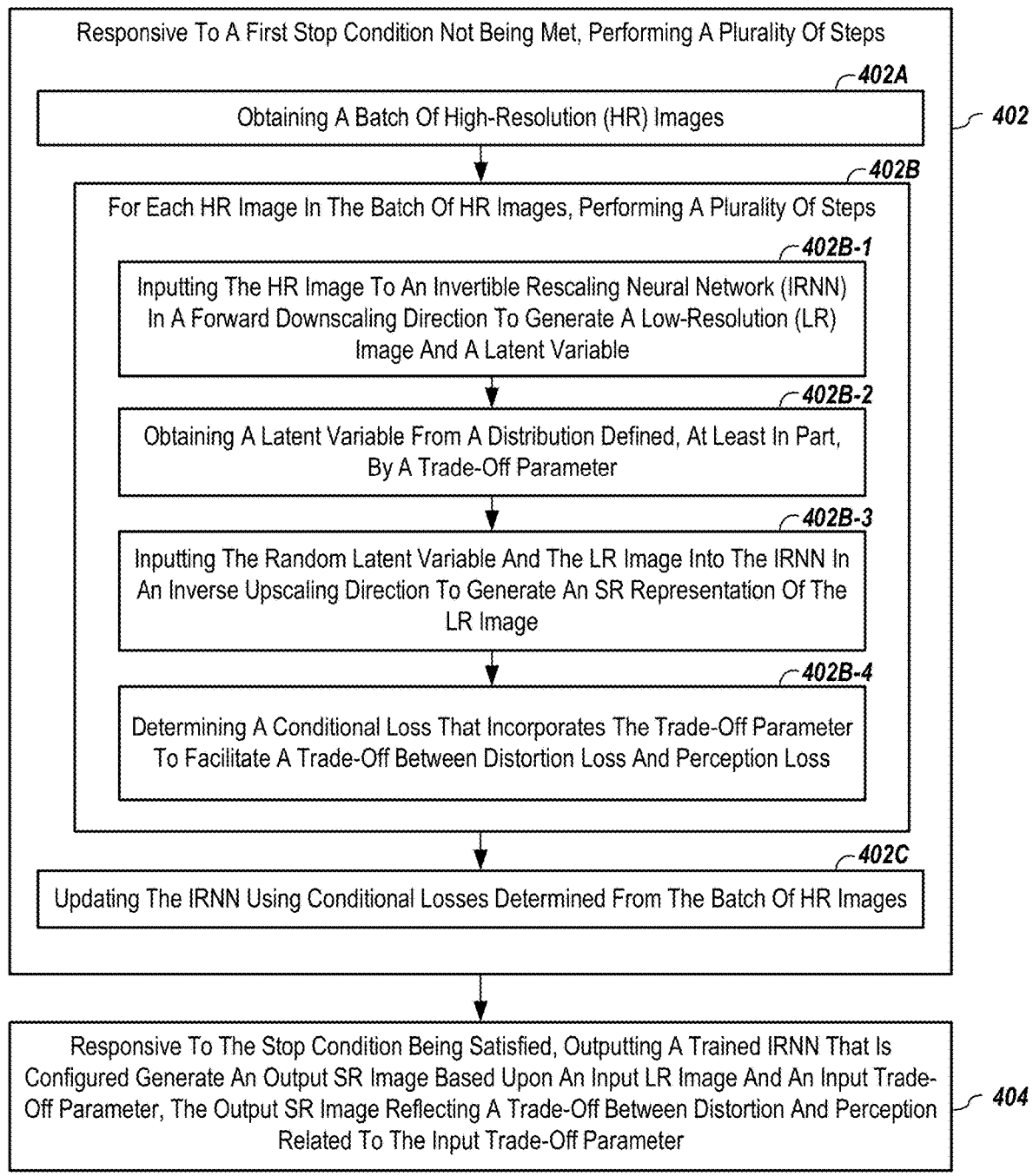
FIG. 4 and FIG. 5 illustrate example flow diagrams depicting acts associated with training and operating an IRNN that reflects a trade-off between distortion and perception, according to embodiments of the present disclosure.
Figure 5:
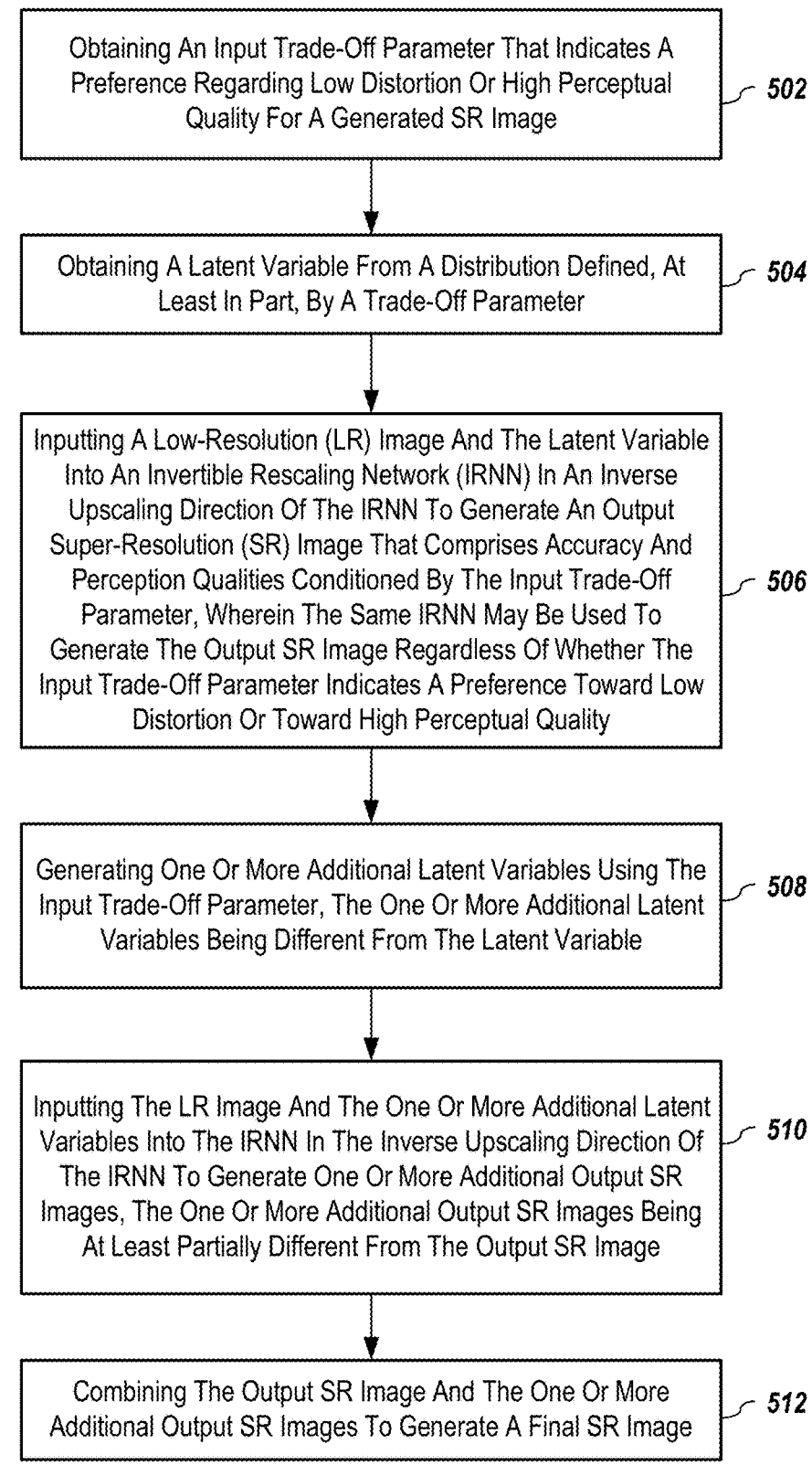

FIG. 4 and FIG. 5 illustrate example flow diagrams 400 and 500, respectively, depicting acts associated with training and operating an IRNN that reflects a trade-off between distortion and perception, according to embodiments of the present disclosure. As noted above, (1) certain steps may optionally be performed; (2) steps may not be limited to the specific order set forth herein; (3) certain steps may be performed in different orders; and (4) certain steps may be done concurrently.

Act 402 of flow diagram 400 includes, until a first stop condition is satisfied, performing a plurality of steps. In one or more embodiments, the first stop condition comprises completion of a first predetermined number of iterations. Act 402 generally corresponds to the training method 206 discussed hereinabove with reference to FIG. 2.

Step 402A of act 402 includes obtaining a batch of high-resolution (HR) images. Step 402B of act 402 includes, for each HR image in the batch of HR images, performing a plurality of steps. In one or more embodiments, the plurality of steps of step 402B are performed until a second stop condition is satisfied, such as completion of a predetermined number of iterations, and/or others.

Step 402B-1 of step 402B includes inputting the HR image to an invertible rescaling neural network (IRNN) in a forward downscaling direction to generate a low-resolution (LR) image and a latent variable. Step 402B-2 of step 402B includes generating or obtaining a latent variable from a distribution that is defined, at least in part, by a trade-off parameter. In one or more embodiments, the latent variable is a value randomly sampled from a normal distribution, which may be centered on zero and has a standard deviation related to the trade-off parameter. In one or more embodiments, the trade-off parameter comprises a value within a range of 0 to 1.

Step 402B-3 of step 402B includes inputting the latent variable and the LR image into the IRNN in an inverse upscaling direction to generate an SR representation of the LR image. Step 402B-4 of step 402B includes determining a conditional loss that incorporates the trade-off parameter between, the conditional loss facilitating a trade-off between distortion loss and perception loss. In one or more embodiments, a plurality of different trade-off parameters is used to generate a plurality of conditional losses for each HR image in the batch of HR images. In one or more embodiments, the plurality of different trade-off parameters comprises a plurality of predefined values within a range of 0 to 1. In one or more embodiments, the plurality of predefined values comprise values of 0, 0.5, and 1. In one or more embodiments, the distortion loss is based upon a difference between a ground truth high-resolution (HR) image and the SR representation of the LR image. In one or more embodiments, the perception loss is based upon the output of a generative adversarial network configured to distinguish the ground truth HR image from the SR representation of the LR image. In one or more embodiments, the generative adversarial network is updated for at least one or more batches of HR images to further train the generative adversarial network to distinguish the ground truth HR image from the SR representation of the LR image. In one or more embodiments, the perception loss is further based upon a feature reconstruction loss. In one or more embodiments, the trade-off between distortion loss and perception loss is facilitated by multiplying the perception loss by the trade-off parameter and multiplying the distortion loss by a complement of the trade-off parameter.

Step 402C of act 402 includes updating the IRNN using conditional losses determined from the batch of HR images. In one or more embodiments, the IRNN is updated further using guidance losses determined from the batch of HR images.

Act 404 of flow diagram 400 includes, responsive to the stop condition being satisfied, outputting a trained IRNN that is configured generate an output SR image based upon an input LR image and an input trade-off parameter, the output SR image reflecting a trade-off between distortion and perception related to the input trade-off parameter.

Act 502 of flow diagram 500 includes obtaining an input trade-off parameter that indicates a preference regarding low distortion or high perceptual quality for a generated SR image.

Act 504 of flow diagram 500 includes generating a latent variable from a distribution that is defined, at least in part, using the input trade-off parameter. For example, in one or more embodiments, the latent variable is a value randomly sampled from a normal distribution that is centered on zero and has the input trade-off parameter as its standard deviation.

Act 506 of flow diagram 500 includes inputting a low-resolution (LR) image and the latent variable into an invertible rescaling network (IRNN) in an inverse upscaling direction of the IRNN to generate an output super-resolution (SR) image that comprises accuracy and perception qualities conditioned by the input trade-off parameter, wherein the same IRNN is utilized to generate the output SR image regardless of whether the input trade-off parameter indicates a preference toward low distortion or toward high perceptual quality. In one or more embodiments, the LR image is obtained from a trained IRNN utilizing an input high-resolution (HR) image in a forward downscaling direction of the trained IRNN. In one or more embodiments, the LR image is generated as part of a compression operation, and wherein the HR image may not be available or not readily available.

Act 508 of flow diagram 500 includes obtaining one or more additional latent variable values using the input trade-off parameter, the one or more additional latent variable values being different from the initial latent variable. In like manner as described above, the one or more additional latent variables may be obtained by randomly sampling from a distribution or distributions.

Act 510 of flow diagram 500 includes inputting the LR image and the one or more additional latent variables into the IRNN in the inverse upscaling direction of the IRNN to generate one or more additional output SR images, the one or more additional output SR images being at least partially different from the output SR image.

Act 512 of the flow diagram includes combining the output SR image and the one or more additional output SR images to generate a final SR image.

G. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

The same training strategy and settings (e.g., datasets, hyperparameters like batch size) that were used in previous IRN work were used for the experiments that will now be discussed. The disclosed joint optimization was applied to a pre-trained IRN+ model (that utilizes a generative adversarial network to generate $L_d$. There was a total of 200,000 iterations in training, from an initial learning rate of $1 \times 10^{-4}$ which decays by half after every 40,000 iterations. The trained model is denoted below as $IRN_o$ for convenience.

For quantitative assessment of objective qualities, the PSNR and SSIM on the Y channel in the YCbCr color space were used. To assess perception, the learned perceptual image patch similarity (LPIPS) metric is utilized in view applicability as a metric of perceptual quality when the GT reference is known.

1. Optimization Strategy Embodiments

Figure 6:
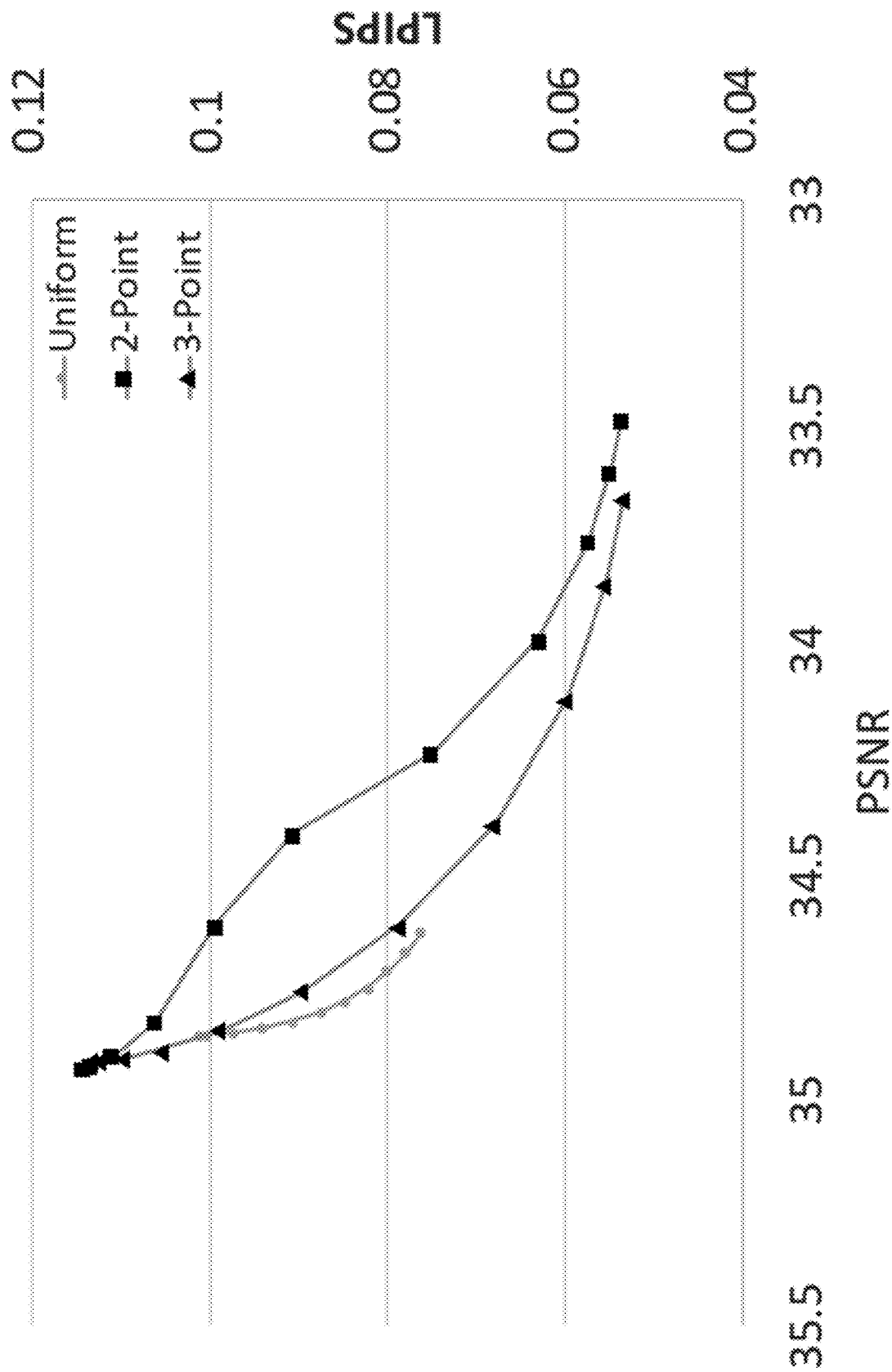
FIG. 6 depicts a graph illustrating perception-distortion trade-off for different trade-off parameter sampling strategies for training an IRNN, according to embodiments of the present disclosure.

As discussed hereinabove, the joint optimization process may be implemented by rotating different a for $z=N(0, \sigma)$ at training and using conditioned losses that rely on $\sigma$ as a parameter. As shown in FIG. 6, three different sampling strategies are compared using a perception-distortion trade-off curve of a validation dataset (referred to herein as "Dataset 5") in ×4, which is plotted by connecting points in PSNR-LPIPS coordinates when setting $\sigma$ from 0 to 1 with 0.1 increments during testing. As depicted in FIG. 6 with the line marked by circles, when $\sigma$ is drawn from a uniform distribution between 0 and 1 at training, it provides the best trade-off between objective and perceptual qualities compared to two other sampling strategies, as it is closer to the lower-left corner overall. However, this curve collapses to a very small range, and the individual peak value of PSNR and LPIPS is significantly worse than the other two. The 2-point sampling strategy, where $\sigma$ is either 0 or 1, generated the highest PSNR and lowest LPIPS individually but the trade-off in the middle experiences an inferior trade-off between objective and perceptual qualities. The 3-point (0, 0.5, and 1) sampling exhibited the best performance overall, capable of equivalent individual peak performance while enjoying greatly improved trade-off compared to 2-point sampling. $IRN_\sigma$ used in all following assessments was trained with 3-point sampling of $\sigma$ unless specified otherwise.

2. Quantitative and Qualitative Results

Existing processes against which the disclosed embodiments are compared in these experimental results are:

"IRN", "IRN+": Mingqing Xiao, Shuxin Zheng, Chang Liu, Yaolong Wang, Di He, Guolin Ke, Jiang Bian, Zhouchen Lin, and Tie-Yan Liu, "Invertible image rescaling," in *European Conference on Computer Vision*. Springer, 2020, pp. 126-144.

"RCAN": Yulun Zhang, Kunpeng Li, Kai Li, Lichen Wang, Bineng Zhong, and Yun Fu, "Image super-resolution using very deep residual channel attention networks," in *Proceedings of the European Conference on Computer Vision (ECCV)*, 2018, pp. 286-301.

"ERSGAN": Xintao Wang, Ke Yu, Shixiang Wu, Jinjin Gu, Yihao Liu, Chao Dong, Yu Qiao, and Chen Change Loy, "ESRGAN: Enhanced super-resolution generative adversarial networks," in *Proceedings of the European Conference on Computer Vision (ECCV)*, 2018, pp. 63-79.

Figure 7:
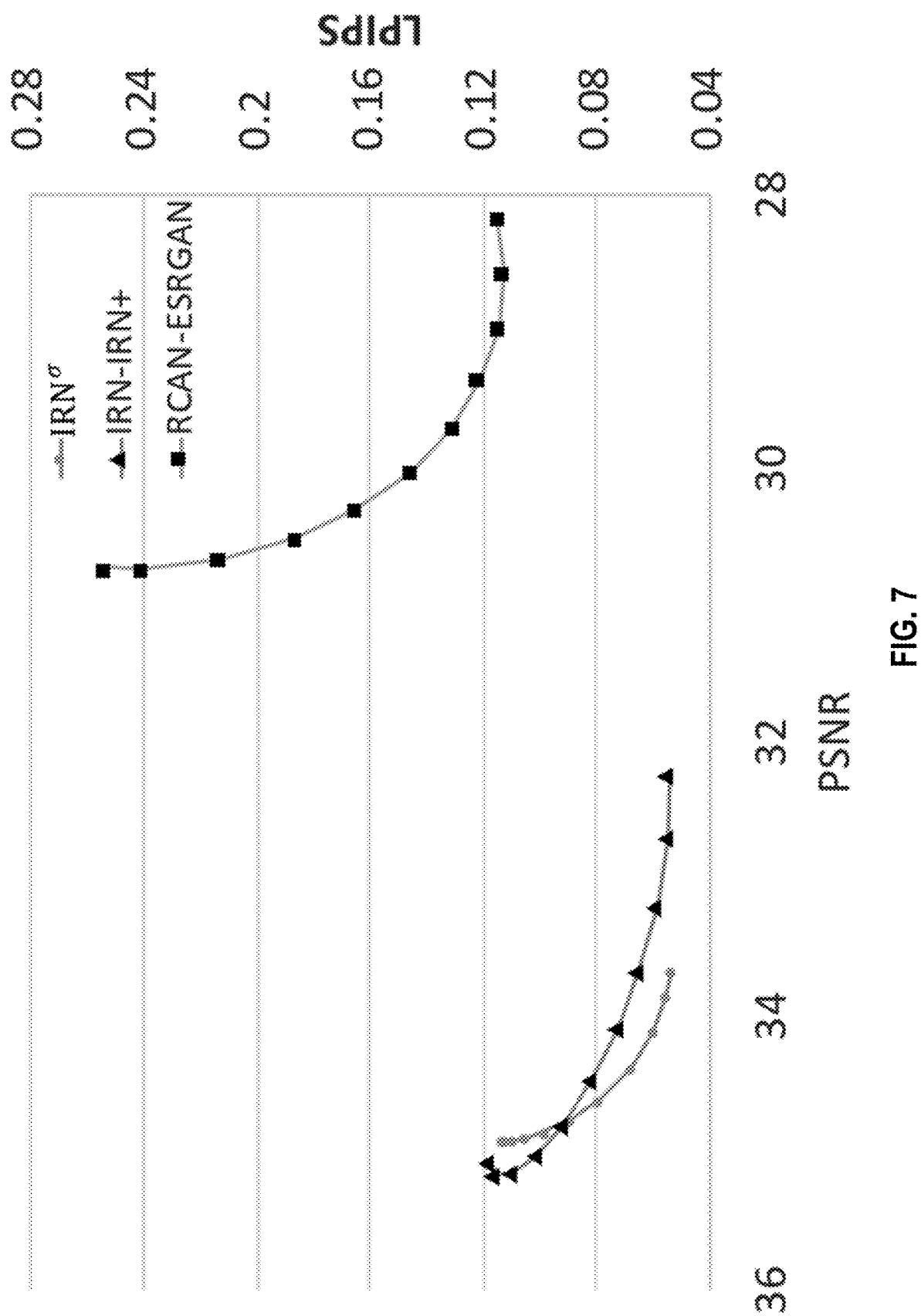
FIG. 7 depicts a graph comparing perception-distortion trade-off of different SR and rescaling models, according to embodiments of the present disclosure.

The perception-distortion trade-off curves are plotted for three processes in FIG. 7. For the process in FIG. 7 denoted with squares, RCAN is chosen as the SR baseline for minimum distortion and ESRGAN is chosen for best perception. The trade-off curve is generated by interpolating images from the two models. The IRN-IRN+ process of FIG. 7 is generated similarly from a distortion-optimal IRN and perception-optimal IRN+. As is evident from FIG. 7, in view of IRN and IRN+ being optimized for end-to-end downscaling and inverse upscaling, IRN-IRN+ outperforms the RCAN-ESRGAN SR baseline by a remarkably large margin for both objective and perceptual metrics. Note that both processes use interpolation from two individually trained models. In contrast, in accordance with the present disclosure, only one jointly optimized model is needed to generate the trade-off curve of $IRN_\sigma$ by setting different $\sigma$ values to generate $z_\sigma$ during upscaling. Comparing to IRN-IRN+, the curve is shifted to the lower-left in general, meaning improved performance in both distortion and perception. While it has a slightly lower peak PSNR value, its peak LPIPS value is better than IRN+ while achieving significantly less distortion (higher PSNR).

This advantage of increased PSNR for outputs of high perceptual qualities is consistent throughout different datasets as shown in FIG. 8. The table of FIG. 8 includes comparisons of objective and perceptual qualities for upscaled ×4 images of 5 datasets, with the best results underlined with solid lines and with the second-best results underlined with dashed lines. $IRN_{\sigma:0}$ and $IRN_{\sigma:1}$ refer to results from $IRN_\sigma$ while fixing $\sigma$ at 0 and 1 during inference, respectively.

Results from $IRN_{\sigma:1}$ have the lowest LPIPS for 3 out of 5 datasets, only falling behind IRN+ slightly for the other two, while leading IRN+ in PSNR by 1.16 or more for all 5 datasets. For objective metrics PSNR and SSIM, $IRN_{\sigma:0}$ is slightly behind IRN as the second best, trailing by 0.11 to 0.20 in PSNR for all 5 test sets.

Figure 9:
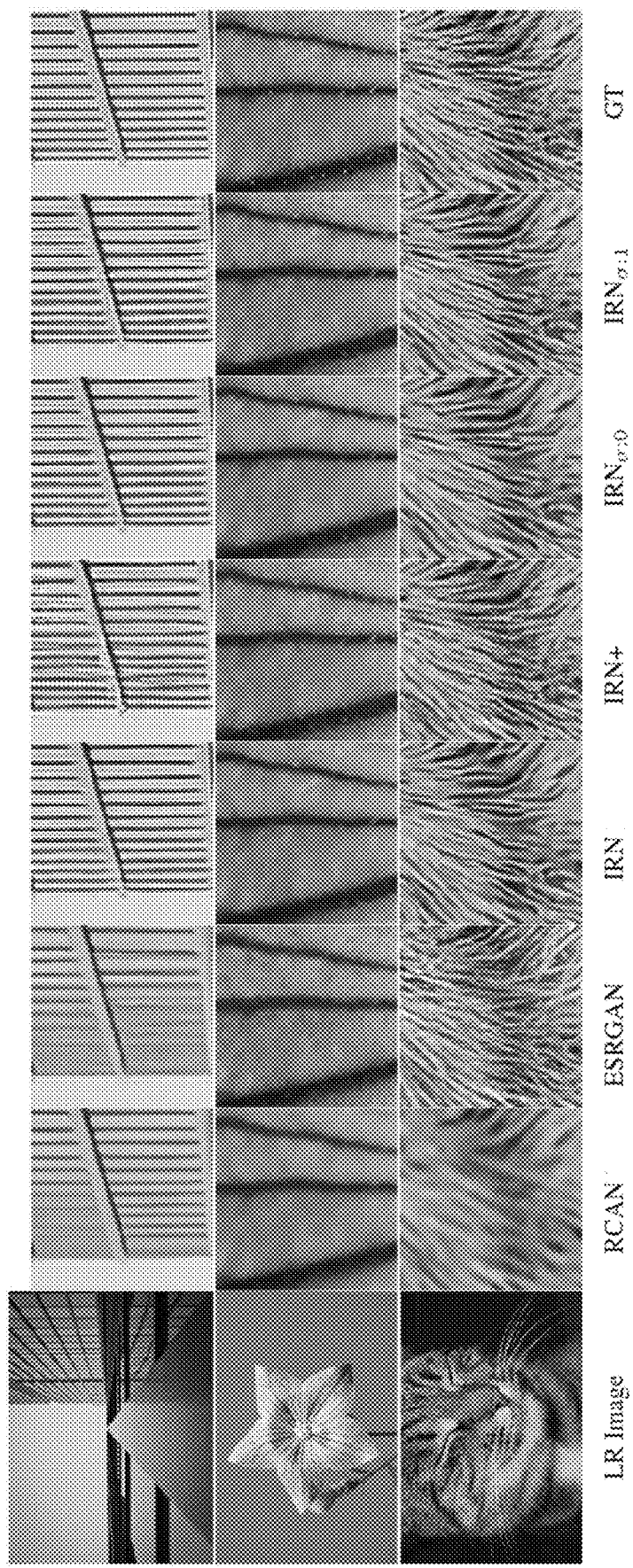
FIG. 9 depicts some visual examples of various approaches, according to embodiments of the present disclosure.

Qualitative assessments were performed using visual examples. While ESRGAN produced much sharper images than RCAN, it failed to reconstruct line details and generated unnecessary details, causing compromised accuracy. While both IRN and $IRN_{\sigma:0}$ appear to generate images with equivalent perceptual quality, IRN+ tends to introduce more artifacts, like curvatures in straight lines. FIG. 9 depicts some visual examples of various approaches, according to embodiments of the present disclosure.

H. Some Observations

Embodiments of a simple and effective joint optimization framework are disclosed to address at least one major challenge in learned image rescaling: the conflict between maximization of objective and perceptual qualities. Embodiments introduce losses conditioned on the random sampling of latent variable z. The model embodiments may be trained to minimize distortion loss more when z has a lower entropy (smaller $\sigma$ in $N(0, \sigma)$) and optimized for lower perception loss when $\sigma$ is larger. It has been shown that using a 3-point sampling of $\sigma$ at training, one optimized $IRN_\sigma$ can generate multiple upscaled images with adjustable trade-off between perception and distortion from one input, which is only possible under conventional methods with two separate models.

As shown in the Experimental Results section, there is a significant performance gap between the tested embodiment and RCAN & ESRGAN (individually and jointly). At least one reason for the tested embodiment's superior performance is that the latter two approaches are super-resolution models optimized for upscaling reconstruction only. In contrast, the tested embodiment was trained to optimize both downscaling and upscaling jointly. As briefly explained, few, if any, previous works try to solve this bidirectional rescaling (downscaling and upscaling) task using deep learning methods—especially as contemplated herein. IRN may be the best of this line of models to date, but it is important to note that the tested embodiment yields a significant advantage of PSNR over IRN+, especially when the perception quality is about the same, as demonstrated in FIG. 7. As IRN+ is trained with a mixture of losses with the majority of them being related to perceptual qualities, this may lead the optimization process to gain marginal improvement in perceptual quality while suffering significant loss in objective quality (PSNR). In comparison, the tested embodiment was trained with a balanced sampling between $\sigma=0$ and $\sigma=1$, which leads to better PSNR than IRN+, particularly when $\sigma=1$.

It shall also be noted that embodiments of the present patent document have several applications. For example, one embodiment is for generating higher resolution images from a lower resolution image. Another application is for compression. Lower resolution images may be stored, and higher resolution images may be generated using an IRNN embodiment of the present patent document. In one or more embodiments, an IRNN embodiment may be used to generate the LR image, and the same or different IRNN embodiment may be used to generate or recover the original HR image. One skilled in the art shall recognize embodiments may be used for or adapted for other applications.

I. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 10:
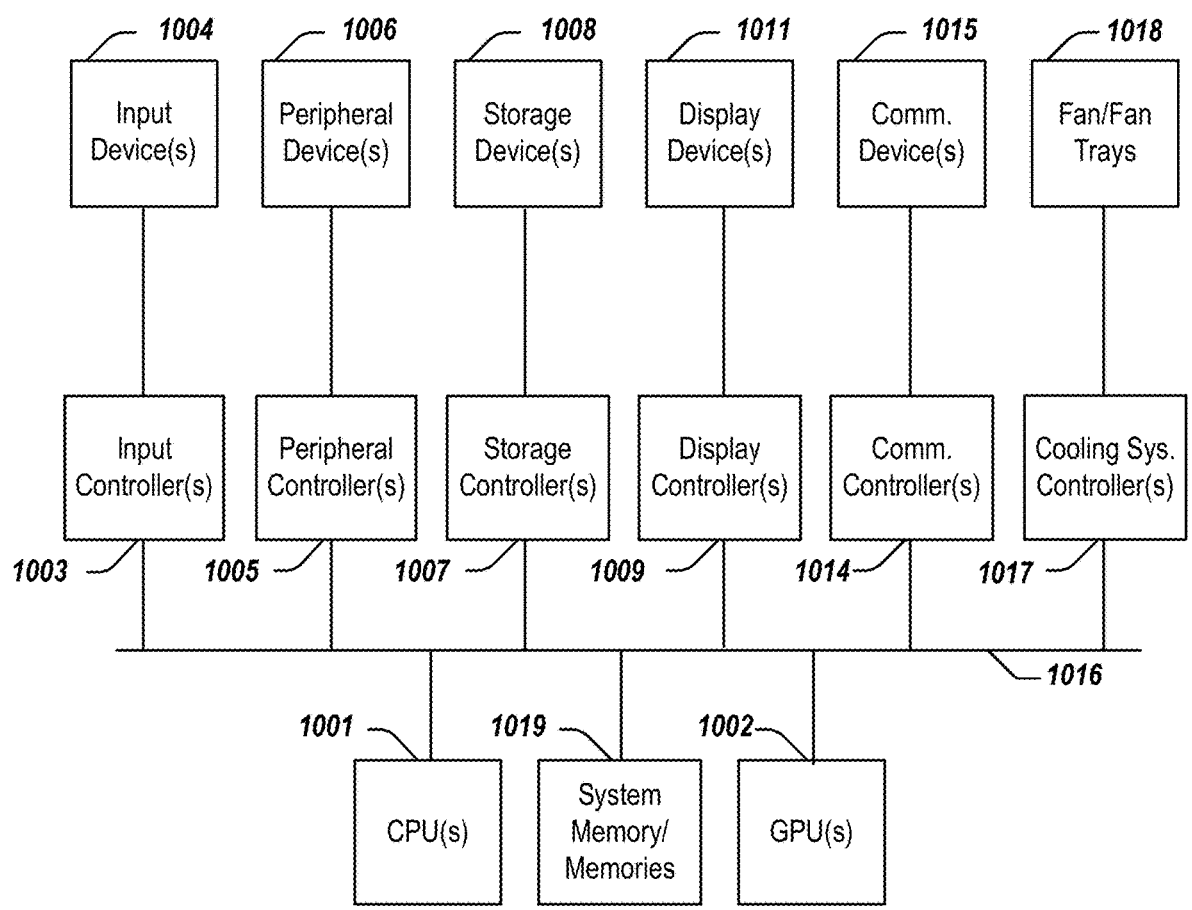
FIG. 10 depicts a simplified block diagram of a computing device/information handling system, according to embodiments of the present disclosure.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more CPUs 1001 that provide computing resources and control the computer. CPU 1001 may be implemented with a microprocessor or the like, and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. The system 1000 may also include a system memory 1019, which may comprise RAM, ROM, or both.

A number of controllers and peripheral devices may also be provided, as shown in FIG. 10. An input controller 1003 represents an interface to various input device(s) 1004. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training an invertible rescaling neural network (IRNN) to generate super-resolution (SR) imagery from low-resolution (LR) imagery, the method comprising:
responsive to a stop condition not being satisfied, performing steps comprising:
obtaining a batch of high-resolution (HR) images;
for each HR image in the batch of HR images:
inputting the HR image to an IRNN in a forward downscaling direction to generate an LR image;
obtaining a latent variable from a distribution, which is related, at least in part, to a trade-off parameter;
inputting the latent variable and the LR image into the IRNN in an inverse upscaling direction to generate an SR representation of the LR image; and
determining a conditional loss that incorporates the trade-off parameter to facilitate a trade-off between distortion loss and perception loss; and
updating the IRNN using conditional losses determined from the batch of HR images; and
responsive to the stop condition being satisfied, outputting a trained IRNN that is configured to generate an output SR image based upon an input LR image and an input trade-off parameter value, the output SR image reflecting a trade-off between distortion and perception related to the input trade-off parameter value.

2. The computer-implemented method of claim 1, wherein the latent variable is generated as a random normal distribution centered on zero using the trade-off parameter as a standard deviation.

3. The computer-implemented method of claim 2, wherein the trade-off parameter comprises a value within a range of 0 to 1.

4. The computer-implemented method of claim 3, wherein a plurality of different trade-off parameters is used to generate a plurality of conditional losses for each HR image in the batch of HR images.

5. The computer-implemented method of claim 4, wherein the plurality of different trade-off parameters comprises a plurality of predefined values within a range of 0 to 1.

6. The computer-implemented method of claim 5, wherein the plurality of predefined values comprises values of 0, 0.5, and 1.

7. The computer-implemented method of claim 1, wherein the distortion loss is based upon a difference between a ground truth high-resolution (HR) image and the SR representation of the LR image.

8. The computer-implemented method of claim 7, wherein the perception loss is based upon an output of a generative adversarial network configured to distinguish the ground truth HR image from the SR representation of the LR image.

9. The computer-implemented method of claim 8, wherein the generative adversarial network is updated for at least one or more batches of HR images to further train the generative adversarial network to distinguish the ground truth HR image from the SR representation of the LR image.

10. The computer-implemented method of claim 8, wherein the perception loss is further based upon a feature reconstruction loss.

11. The computer-implemented method of claim 8, wherein the trade-off between distortion loss and perception loss is facilitated by multiplying the perception loss by the trade-off parameter and multiplying the distortion loss by a complement of the trade-off parameter.

12. The computer-implemented method of claim 1, wherein the IRNN is updated further using guidance losses determined from the batch of HR images.

13. A computer-implemented method for generating super-resolution (SR) imagery from low-resolution (LR) imagery, the method comprising:
obtaining an input value for a trade-off parameter that indicates a preference regarding low distortion between high perceptual quality for a generated SR image;
obtaining a latent variable that is related to the input value for the trade-off parameter; and using an LR image and the latent variable in an invertible rescaling network (IRNN), which was trained using, at least in part, the trade-off parameter, in an inverse upscaling direction of the IRNN to generate an output SR image that comprises accuracy and perception qualities related to the input value for the trade-off parameter.

14. The computer-implemented method of claim 13, wherein the latent variable is generated as a random normal distribution centered on zero using the input value for the trade-off parameter as a standard deviation.

15. The computer-implemented method of claim 13, wherein the LR image is obtained from a trained IRNN utilizing an input high-resolution (HR) image in a forward downscaling direction of the trained IRNN.

16. The computer-implemented method of claim 15, wherein the LR image is generated as part of a compression operation.

17. The computer-implemented method of claim 13, further comprising:
generating or obtaining one or more additional latent variables related to the trade-off parameter, the one or more additional latent variables being different from the latent variable; and
inputting the LR image and the one or more additional latent variables into the IRNN in the inverse upscaling direction of the IRNN to generate one or more additional output SR images, the one or more additional output SR images being at least partially different from the output SR image.

18. The computer-implemented method of claim 17, further comprising:
combining the output SR image and the one or more additional output SR images to generate a final SR image.

19. The computer-implemented method of claim 13, further comprising:
obtaining a second input value for the trade-off parameter that indicates a different preference regarding low distortion or high perceptual quality for a generated SR image;
generating a second latent variable using the second input value for the trade-off parameter; and
inputting the LR image and the second latent variable into the same IRNN used to generate the output SR image to generate a second output SR image that comprises different accuracy and perception qualities than the output SR image.

20. A system for training an invertible rescaling neural network (IRNN) to generate super-resolution (SR) imagery from low-resolution (LR) imagery, the system comprising:
one or more processors; and
one or more non-transitory computer-readable medium or media comprising one or more sets of instructions that, when executed by at least one of the one or more processors, cause steps to be performed comprising:
responsive to a stop condition not being satisfied, performing steps comprising:
obtaining a batch of HR images;
for each HR image in the batch of HR images:
inputting the HR image to an IRNN in a forward downscaling direction to generate an LR image;
obtaining a latent variable from a distribution, in which is related, at least in part, to a trade-off parameter;
inputting the latent variable and the LR image into the IRNN in an inverse upscaling direction to generate an SR representation of the LR image; and
determining a conditional loss that incorporates the trade-off parameter to facilitate a trade-off between distortion loss and perception loss; and
updating the IRNN using conditional losses determined from the batch of HR images; and
responsive to the stop condition being satisfied, outputting a trained IRNN that is configured to generate an output SR image based upon an input LR image and an input value related to the trade-off parameter, the output SR image reflecting a trade-off between distortion and perception related to the input value related to the trade-off parameter.

* * * * *